United States Patent
Cox et al.

(10) Patent No.: US 7,742,937 B2
(45) Date of Patent: Jun. 22, 2010

(54) SYSTEM FOR IMPROVING LOGISTICS, TRACKING AND BILLING FOR WORKER'S COMPENSATION INSURANCE

(75) Inventors: Steven R. Cox, 1818 Greencreek Dr., San Jose, CA (US) 95124; Thomas R. Quirk, 1815 Greencreek Dr., San Jose, CA (US) 95124

(73) Assignees: Steven R. Cox, San Jose, CA (US); Thomas R. Quirk, San Jose, CA (US)

( * ) Notice: Subject to any disclaimer, the term of this patent is extended or adjusted under 35 U.S.C. 154(b) by 2849 days.

(21) Appl. No.: 10/091,860

(22) Filed: Mar. 6, 2002

(65) Prior Publication Data

US 2003/0171956 A1    Sep. 11, 2003

(51) Int. Cl.
*G06Q 10/00* (2006.01)
(52) U.S. Cl. .................................... 705/4; 705/2; 705/3
(58) Field of Classification Search .................. 705/2–4
See application file for complete search history.

(56) References Cited

U.S. PATENT DOCUMENTS

| | | | | |
|---|---|---|---|---|
| 6,057,764 | A * | 5/2000 | Williams | 340/572.1 |
| 6,604,080 | B1 * | 8/2003 | Kern | 705/4 |
| 2002/0111725 | A1 * | 8/2002 | Burge | 701/29 |
| 2002/0184055 | A1 * | 12/2002 | Naghavi et al. | 705/2 |

FOREIGN PATENT DOCUMENTS

JP          10-48008          * 2/1998

OTHER PUBLICATIONS

DW 1004024073, Germany.*
http://www.workcover.nsw.gov/au/WorkersCompensation/Premiums/RatesSet/default.htm.*

* cited by examiner

*Primary Examiner*—Vivek D Koppikar
(74) *Attorney, Agent, or Firm*—Doyle Johnson; Charlie Kulas

(57) ABSTRACT

A system for improving worker's compensation programs. Employee presence is detected by using proximity sensors at different places in the workplace. For example, where a company has different workshops, offices, rooms, or other areas, detection of a worker's presence in one or more of the areas allows more accurate information to be used to calculate liabilities such as risk of injury. Data about a worker's presence, duration of presence, repeated presence, or other characteristics of a worker in an area are sensed and logged by a digital system. The system can store and process the data locally, or the data (or a derivative of the data) can be transferred to other entities for storage, processing, analysis or other purposes. For example, the presence data can be sent to insurance providers for calculation of accurate premiums, risk, payouts, etc.

18 Claims, 3 Drawing Sheets

SYSTEM FOR IMPROVING LOGISTICS, TRACKING AND BILLING FOR WORKER'S COMPENSATION INSURANCE

BACKGROUND OF THE INVENTION

This invention relates in general to information processing and more specifically to a system for tracking, analyzing and managing information related to payment of worker's compensation premiums.

Currently California, and most other states, base their worker's compensation insurance rates on an individual employee's job classification (type of job they do e.g. software engineer, maid, etc.) coupled with the employee's overall annual compensation package (salary, bonuses, car allowance, sales commissions). Using these criteria and guidelines from the California Worker's Compensation Insurance Rating Bureau, the insurance companies bill their customers accordingly.

This system has weaknesses that can lead to inaccurate calculation of customer premiums. For example, customer premiums paid by companies to insurance carriers may not be indicative of the companies' employees' actual job liability or how many hours an employee works. Instead, the premiums are heavily based on an employee's overall compensation and job classification, even though these factors may not have much to do with a likelihood of injury. In addition, an employee's worker's compensation benefits do not necessarily correspond with the premium paid. For example, for a highly paid executive, the premium will be much higher (due to higher compensation) even though the executive is less likely to be injured on the job than someone like a drill-press operator or a networking hardware engineer working in a lab. Also, if the executive is injured, the worker's compensation benefit is't appreciably more than the drill-press operator or hardware engineer, even though the premium paid for the executive's worker's compensation insurance was much higher.

Another drawback with traditional approaches to worker's compensation is that they often require manual, labor-intensive yearly audits and post-facto billing. As often as quarterly, an insurance company might audit the payroll records of customers, usually 45 to 60 days following the expiration of a policy. These audits are bothersome to most insurance customers, are costly, unproductive, and there are no uniform electronic data collection methods to aid in this process. In addition, because an insured company's premiums and audits are post-facto and not during or at the close of the business quarter in which they were used, tax and financial planning/reporting is more complicated. SEC reporting and general expense planning procedures are also impacted.

Today's worker's compensation plans use confusing multifaceted payroll adjustments. The insurance customer must frequently adjust the payroll parameters such as executive compensation, overtime pay, meals, lodging, car allowance, and other items. Moreover, the nature of these adjustments can change anytime an employee's compensation criteria changes.

Many of these parameters have no real bearing on an employee's worker's compensation, liability or benefit and yet must be included in reports and procedures in order to meet state and insurance company guidelines. In addition, because worker's compensation premiums are primarily compensation-based, there is an inherent disincentive for employers to increase employees' compensation because the employer will, in turn, have to pay a higher worker's compensation premium for that employee.

In some cases, an employer may be paying premiums based on two or more compounding calculations. This can be prejudicial and detrimental to the employees and the employer and does nothing to improve the insuree's "real" coverage.

Another common practice with today's worker's compensation systems is to assign a same job classification to all employees. This single classification can be the most expensive one for the employer. In other words, an employer may have all employees assigned to a classification requiring the highest worker's compensation premiums even though only one, or a few, employees are at that higher classification. In California, this is known as the "Single Enterprise Rule".

For example, a software company's software engineers will have a certain classification. As long as they only have workstations and normal cubicles at work, they will maintain a software or clerical type insurance classification. However, if they add a small lab with one hardware engineer then everyone at the company might be reclassified to the higher "hardware engineer" rate due to a perceived higher risk in the workplace. However, the fact may be that none of the clerical or software engineers may ever go inside this small lab and incur any greater risk of injury.

In summary, the result of the aforementioned anomalies in today's worker's compensation systems is that premiums charged to companies don't accurately reflect the true liability of any particular worker. In addition, the systems' rating structures can be unnecessarily complex, making it difficult to track, audit, and project accurate rates that reflect actual current and future liabilities. Today's systems can also be unfair and prejudicial to the employers and employees by creating a disincentive for increasing employees' compensation, which would in-turn increase their associated worker's compensation premium. Today's systems sometimes unfairly treat all employees under a single (most expensive) job classification, thereby unnecessarily overcharging employers for worker's compensation premiums.

SUMMARY OF THE INVENTION

A system for improving worker's compensation programs. One aspect of the invention provides for detecting and monitoring employee whereabouts by using proximity sensors at different places in the workplace. For example, where a company has different workshops, offices, rooms, or other areas, detection of a worker's presence in one or more of the areas, allows more accurate information to be used to calculate liabilities such as risk of injury.

Data about a worker's presence, duration of presence, repeated presence, or other characteristics of a worker in an area are sensed and logged by a digital system. The system can store and process the data locally, or the data (or a derivative of the data) can be transferred to other entities for storage, processing, analysis or other purposes. For example, the presence data can be sent to insurance providers for calculation of accurate premiums, risk, payouts, etc.

In one embodiment, the system provides a method for assessing risk to a human in an environment, wherein the environment includes multiple areas, the method comprising detecting the presence of the human in at least one area; and using the detected presence to derive a risk assessment.

DETAILED DESCRIPTION OF A PREFERRED EMBODIMENT

A preferred embodiment of the system is designed to work with companies with existing card reader-based security systems. Detection systems, such as for security or entry access, may already be present at companies and can be used with the present invention. This approach saves on installation costs. Alternatively, a new detection system can be installed for companies that do not already have a detection system that can be adapted for use with the invention.

Different types of detection technology can be employed. For example, magnetic, infrared, radio frequency, bar code, retinal or fingerprint scanning, face recognition, keycode or password keypads, etc., can all be used with the present invention. In general, any system that allows worker location or presence to be conveyed to an electronic system can be used with the present invention. Some types of detection systems may require employees to possess objects, such as keycards, passes, etc., for detection to occur.

Other approaches to presence detection can use a plain-old telephone system (POTS) whereby an employee calls a specified number when entering an area or location. Manual or automatic entry of the location can be effected by using the caller identification (caller ID) feature or other information provided by the phone system. The cellular telephone network can be used to locate an employee within a cell based on a signal from a cell phone associated with the employee.

Additional systems include the Global Positioning Satellite (GPS), camera imaging, etc. Any manner of presence detection can be employed.

Figure 1:
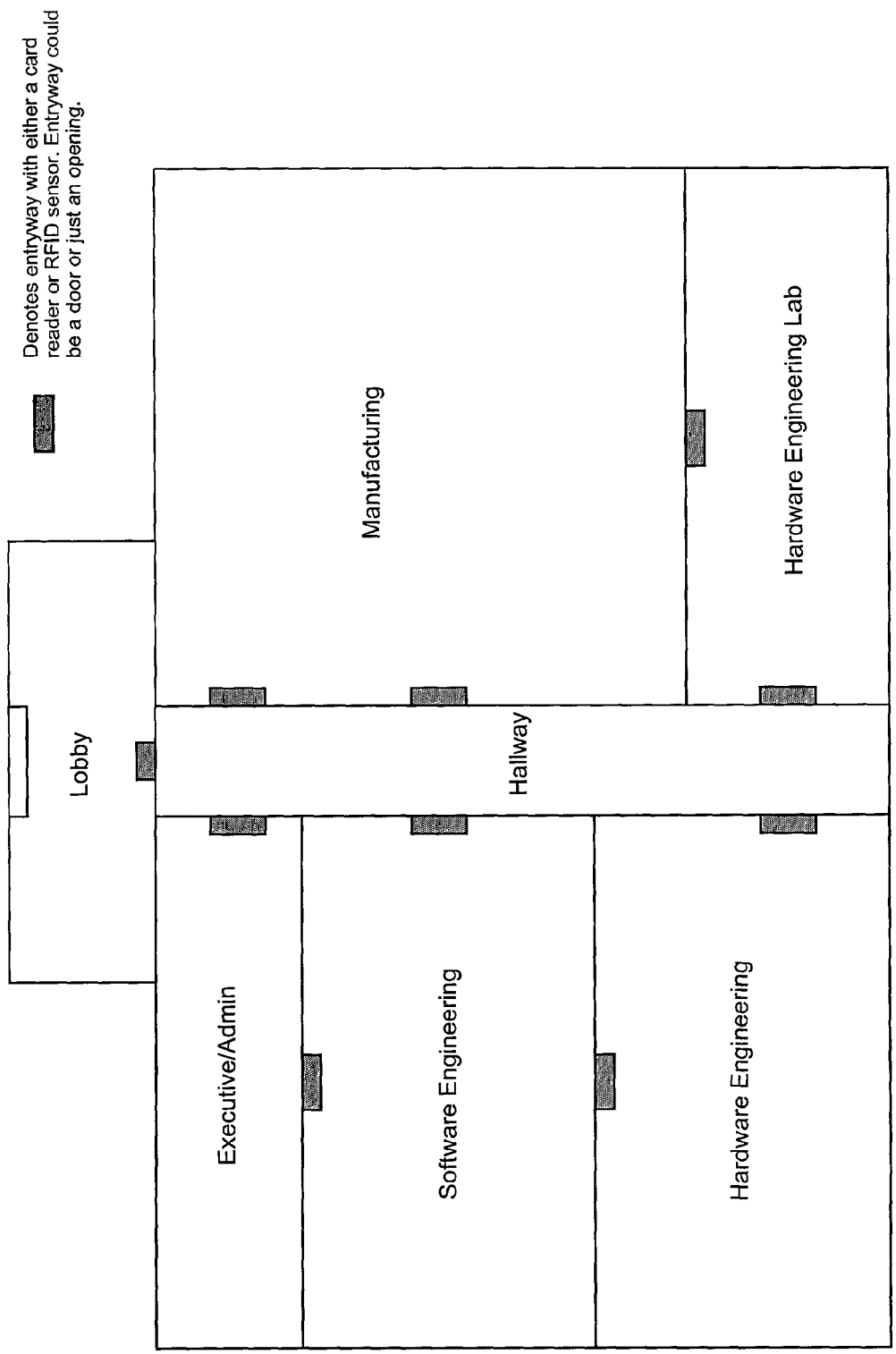
FIG. 1 illustrates the use of liability zones and sensors used to detect presence of employees in different zones.

FIG. 1 illustrates the use of liability zones and sensors used to detect presence of employees in different zones.

In FIG. 1, an insured enterprise is divided into liability zones, which can have different weightings with regards to liability. For example, a typical enterprise may be segmented into the following areas: executive/administrative, software development, hardware development lab, and manufacturing. Each of these areas has very different levels of risk. For example, a hardware development lab is likely to be more dangerous than an executive/admin area or software development area. Similarly, a manufacturing area is usually more dangerous than other areas.

The risk level of an area can be obtained from data, studies, projections, etc, as is known in the art. As employees move among different zones, their presence in the zones is detected via sensored entryways. Individual worker's compensation premiums can thus be computed dynamically depending on the zones entered, the amount of time in the zones, the projected times in zones, derived computation or analysis of risk, and other factors. A preferred embodiment computes liability rates based on individual workers' characteristics in near real-time. Such a system is referred to as "DynaRate™."

The DynaRate™ approach allows very accurate risk assessment for each employee based on employee whereabouts and predicted whereabouts. Other factors can also be used, such as the nature of an employee's work, statistics on performance and past incidents, etc. In a preferred embodiment, the system computes a liability rate based on the risk assessment data of a specific zone and how long the worker spends in that zone. Risk can be computed, monthly, weekly, daily or even more often. Naturally, any time-dependent computations, or assessments, of risk can occur at any interval. There is a tradeoff between accuracy and system resources (e.g., computing cycles, storage space, bandwidth, etc.).

In some embodiments it may not be necessary to detect all employees, or to have sensors in all rooms, areas, or places of a workplace. Neither is it necessary to specifically identify all, or any, of the employees. For example, improved risk assessment might be achieved merely by knowing the number of people who are in a given area over a period of time. Or by knowing the general movement, activity or other characteristics of worker behavior that can be obtained from presence sensing.

As an example of a type of computation that is relevant to risk assessment, a software engineer would primarily spend his/her time in the software development area and would incur that liability zone's premium. However, because the software engineer is writing software to drive certain hardware functionality, they may have to periodically work in the hardware development lab with the hardware engineers on the project. Consequently, the software engineer will now cross into a higher-liability zone, which will trigger an increase in the software engineer's workers compensation premium for the time they are in this higher-liability zone. In a preferred embodiment, a workers compensation liability rate is generally calculated as $$\Sigma(\text{Time in a Liability Zone} \times \text{Liability Zone Premium for that Zone})$$

Note that the rate for this software engineer is not based on their salary, which has no bearing on how dangerous their job might be in each zone, how much money should be charged for their premium, or how much they might get in workers compensation benefits if they do get hurt. It is based solely on how much time they spend in each of the liability zones and the weighting or premium for each liability zone. More dangerous zones justify a higher premium. Measured intervals in a zone could be as small as 1-5 minutes, or any other desired interval.

The system accurately accounts for employee actions that may be divergent, unexpected, or intermittent. For example, if the software engineer needs to go out on the manufacturing floor to help debug a new product, the liability zone premium would then increase to reflect the more dangerous zone being worked in and the increased likelihood that the engineer might be injured and require workers compensation benefits.

Figure 2:
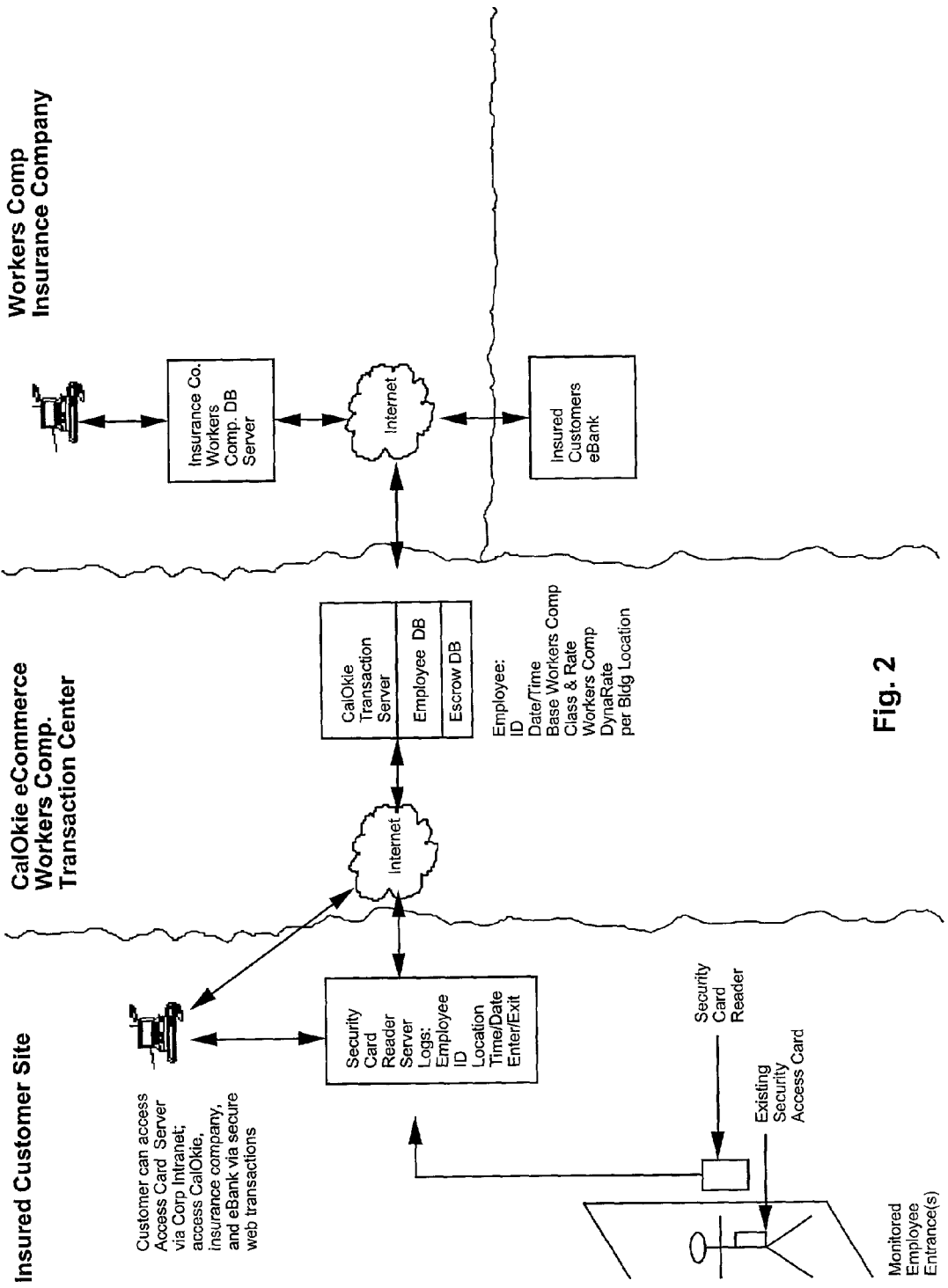
FIG. 2 illustrates detection of worker presence using security card reading systems.
Figure 3:
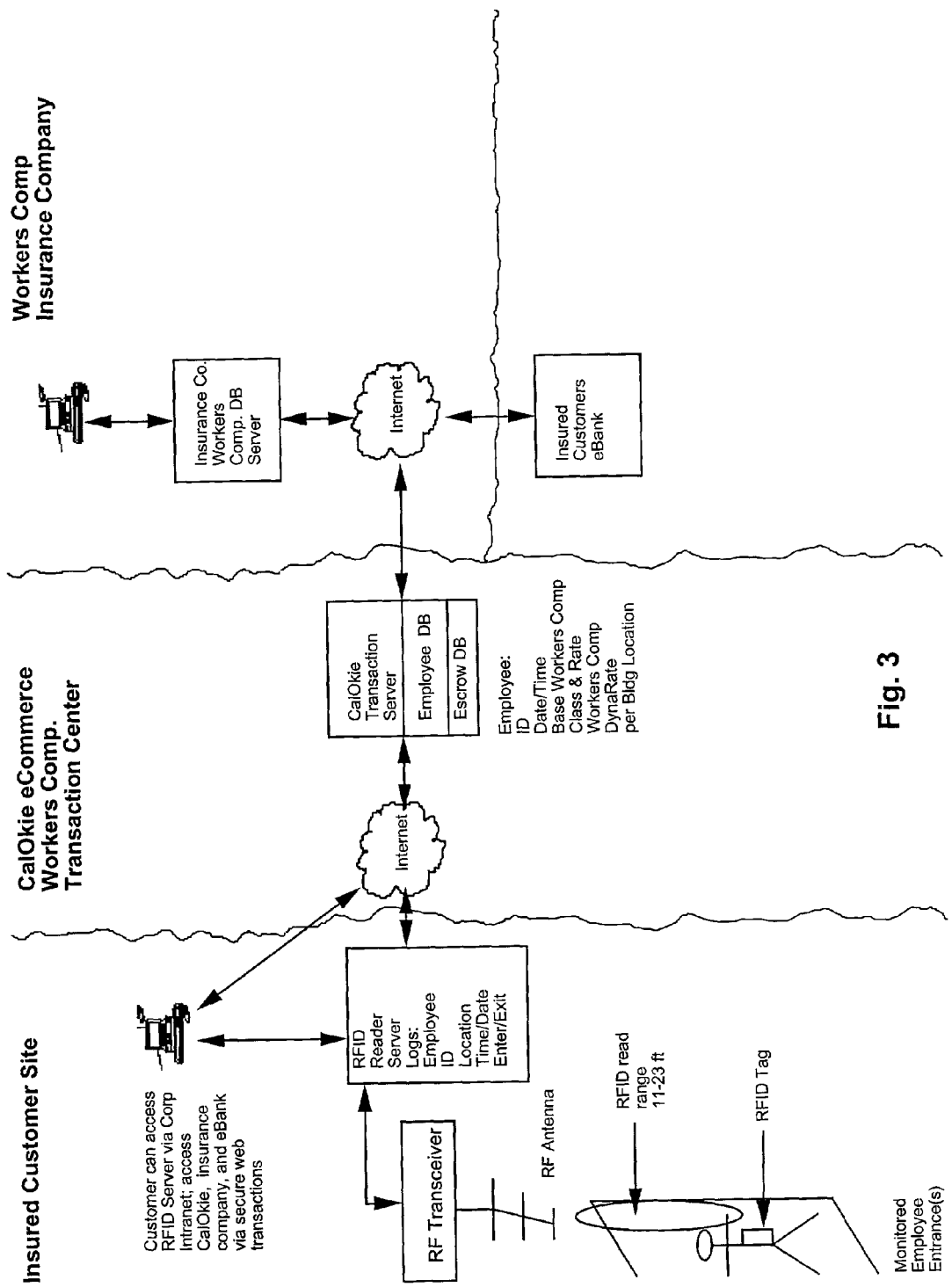
FIG. 3 illustrates a radio-frequency identification approach to determining worker locations.

Sensors at each entryway can be based-on a company's existing security card reading system which requires an employee to explicitly card in and out of an area, as shown in FIG. 2. Alternatively, radio-frequency identification (RFID) sensor technology could be used to monitor each entryway. With RFID technology, each entryway has an RFID transceiver/antenna system, which will actively talk to any RFID employee badges, which pass within that entryway. This approach is less obtrusive to an employee who now only needs to carry the ID badge in order for the system to work. The RFID approach is illustrated in FIG. 3. Suitable RFID systems are manufactured by, e.g., Texas Instruments, Inc. and TEK Industries, among others. Naturally, sensors can be positioned at various points and can be used to detect presence at other points besides an entryway in a room, structure or area.

The collected employee time/position data from the sensors is sent to a local security card or RFID server, which tracks, date/time/location information about each employee per each employee ID badge. This information is then sent via a secure socket through the Internet to an eCommerce Workers Compensation Transaction Center where it is collected into an employee database for the worker's particular company. This database contains workers compensation rate information on each of the employees of a particular company and where/when an employee is at anytime within the enterprise, i.e., within each liability zone.

Calculations are made within the transaction server to determine what the insured company's dynamic insurance premium should be. The transaction server can send detailed periodic reports (e.g., by day, week, month, etc.) to the insured company and it's insurer. In addition, automatic billing can be used to deduct premium payments from the insured company on behalf of the insurer.

The system also provides very powerful data analysis tools, since it can generate real-time and near real-time reports on where people spend their time within an enterprise. This is invaluable in doing periodic workers compensation audits, which are now very painful and time consuming. These reports could now be automated. This system gives the insured company, it's insurer, and the state regulatory authorities access to real-time reports via secure Internet connections, including trend analysis that would be invaluable in improving safety or accuracy of insurance premiums.

Although the invention has been discussed with respect to specific embodiments thereof, these embodiments are merely illustrative, and not restrictive, of the invention.

For example, the invention can be adapted, modified, and utilized by various types of insurance arrangements such as workers compensation programs in different states such as Washington, which uses an hourly-based rate system. The invention can be used in different countries, or for different types of insurance such as property, life, etc. Although a preferred embodiment of the invention focuses primarily on larger businesses in which the employees are primarily on-site, different embodiments can accommodate other scenarios.

Many different formulas, or approaches, for calculating specific rates, risks, liabilities or other aspects of an insurance program can be used. For example, although the preferred embodiment does not use salary, insurance premium charges or potential benefits payments in computing a liability rate, these factors, or others, can be used in different embodiments, as desired.

Different embodiments of the system can include policy and business changes based on collected data. Business to Business e-commerce systems can be implemented that use data collected by the present invention. Such e-commerce systems can use Internet technology for communication and presence detection. Security features such as encryption, Secure Socket Layer (SSL) communications, or other forms of protection can be used when transferring data.

Although the invention has been discussed primarily with respect to a worker's compensation program, aspects of the invention can be used in other applications. The system can be used any time it is useful to analyze a cost, payment, charge, or other aspect that is partly based on humans' presence in different areas. For example, in an entertainment theme park, museum, library, etc., charges can accrue based on an attendee's presence in different areas for the day. Payment to individuals can be based on time spent in an area as where extras in a movie are used for crowd shots, workers are detected in office areas as opposed to recreational areas, etc.

Thus, the invention is not limited solely by the appended claims.

What is claimed is:

1. A method for measuring risk exposure to a human in an environment, wherein the environment includes multiple areas, the method comprising:

detecting the presence of the an and tracking an amount of time the human is present in at least one area with at least one sensor; and
   using the amount of time to derive a measure of risk exposure to the human.

2. The method of claim 1, wherein the step of detecting includes a substep of using a sensor to detect the presence of the human in an area.

3. The method of claim 2, wherein the step of detecting includes using a radio-frequency identification badge.

4. The method of claim 2, wherein the step of detecting includes using a card reader.

5. The method of claim 1, wherein the step of detecting includes a substep of associating an identification of the human with the detection.

6. The method of claim 1, further comprising using the measure of risk exposure in a worker's compensation program.

7. The method of claim 6, further comprising using at least a portion of the measure of risk exposure to determine premiums to be paid by an employer.

8. The method of claim 6, further comprising using at least a portion of the measure of risk exposure to determine benefit payments to be made by an insurer.

9. The method of claim 6, further comprising using at least a portion of the measure of risk exposure to determine projections for the worker's compensation program.

10. An apparatus for obtaining data to determine an insurance premium, the apparatus comprising:

at least one sensor for determining the presence of a human in an at least one area;
    and a processor for receiving a signal from the sensor to indicate the presence of a human, and for tracking an amount of time the human is present in the at least one area,
    wherein one or more processors receive data derived from the signal to determine, at least in part, an insurance premium.

11. A method for determining an insurance premium for a worker in an environment, the method comprising:

defining at least one liability zone within the environment;
    detecting a worker's presence in the at least one liability zone, and tracking an amount of time the worker spends in the at least one liability zone with at least one sensor; and
    calculating an insurance premium based at least in part on the amount of time the worker spends in the at least one liability zone.

12. The method of claim 11, wherein at least two different liability zones are defined, and wherein the different liability zones have different hazard levels.

13. The method of claim 12, wherein an amount of time the worker spends in each liability zone is separately tracked and used to calculate an insurance premium.

14. A system for determining a worker's compensation insurance premium, wherein a work environment has at least one liability zone, the system comprising:

at least one sensor to detect a presence of a worker in the at least one liability zone; and
    a processor for tracking an amount of time the worker is present in the at least one liability zone, based on input from the at least one sensor;
    wherein the amount of time the worker is present in the at least one liability zone is used at least in part to calculate a worker's compensation insurance premium for the worker.

15. The method of claim 1, further comprising:
  detecting the presence of the human and tracking an amount of time the human is present in a plurality of areas; and
  using an amount of time the human is in each of the plurality of areas to derive a measure of risk exposure to the human.

16. The method of claim 15, wherein an insurance premium is calculated based on an amount of time spent in each zone and an amount of liability premium associated with each zone.

17. The system of claim 14, wherein the work environment has a plurality of liability zones, and the processor for tracks an amount of time the worker is present in each of the liability zones, and wherein the amount of time the worker is present in the plurality of liability zones is used at least in part to calculate a worker's compensation insurance premium for the worker.

18. The system of claim 17, wherein each of the plurality of liability zones has its own associated insurance premium, based on a risk level in each zone.

* * * * *